US009805284B2

United States Patent
Yamamoto

(10) Patent No.: US 9,805,284 B2
(45) Date of Patent: Oct. 31, 2017

(54) IMAGE PROCESSING APPARATUS, AND NON-TRANSITORY COMPUTER READABLE MEDIUM FOR GENERATING A FEATURE-REFLECTED IMAGE AND FOR CHANGING A DEGREE OF REFLECTION OF A FEATURE IN THE FEATURE-REFLECTED IMAGE

(71) Applicant: FUJI XEROX CO., LTD., Tokyo (JP)

(72) Inventor: Takayuki Yamamoto, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/218,304

(22) Filed: Jul. 25, 2016

(65) Prior Publication Data

US 2016/0335516 A1 Nov. 17, 2016

Related U.S. Application Data

(62) Division of application No. 14/517,058, filed on Oct. 17, 2014, now Pat. No. 9,424,633.

(30) Foreign Application Priority Data

May 27, 2014 (JP) .................................. 2014-109567

(51) Int. Cl.
*G06K 9/00* (2006.01)
*G06K 9/46* (2006.01)
(Continued)

(52) U.S. Cl.
CPC ....... *G06K 9/4609* (2013.01); *G06F 3/04847* (2013.01); *G06F 3/04886* (2013.01);
(Continued)

(58) Field of Classification Search
CPC ... G06F 3/04847; G06K 9/4609; G06T 11/60; G06T 2207/10024; G06T 2207/20092; G06T 2207/20212; G06T 5/50
See application file for complete search history.

(56) References Cited

U.S. PATENT DOCUMENTS

| 6,504,952 B1 | 1/2003 | Takemura et al. |
| 7,796,812 B2 | 9/2010 | Pitie et al. |

(Continued)

FOREIGN PATENT DOCUMENTS

| JP | 2000-152270 A | 5/2000 |
| JP | 2007-281666 A | 10/2007 |
| JP | 4568692 B2 | 10/2010 |

OTHER PUBLICATIONS

Reinhard, Erik, et al. "Color transfer between images." IEEE Computer graphics and applications 21.5 (2001): 34-41.*

(Continued)

Primary Examiner — Li Liu
(74) Attorney, Agent, or Firm — Sughrue Mion, PLLC

(57) ABSTRACT

Provided is an image processing apparatus including an acquisition section that acquires an object image which is an editing object, a feature quantity acquisition section that acquires a feature quantity of a reference image which is referred to when the object image is edited, a feature-reflected image generation section that reflects a feature of the reference image on the object image by using the feature quantity acquired by the feature quantity acquisition section, and generates a feature-reflected image which is the object image on which the feature is reflected, and a reflection degree changing section that changes a degree of reflection of the feature in the feature-reflected image by using an adjustment value which is input by a user.

15 Claims, 10 Drawing Sheets

(51) Int. Cl.
*G06T 5/50* (2006.01)
*G06T 11/60* (2006.01)
*G06F 3/0484* (2013.01)
*G06F 3/0488* (2013.01)
*G06T 11/00* (2006.01)

(52) U.S. Cl.
CPC .............. *G06T 5/50* (2013.01); *G06T 11/001* (2013.01); *G06T 11/60* (2013.01); *G06T 2200/28* (2013.01); *G06T 2207/10024* (2013.01); *G06T 2207/20092* (2013.01); *G06T 2207/20212* (2013.01); *G06T 2207/20216* (2013.01)

(56) References Cited

U.S. PATENT DOCUMENTS

| | | |
|---|---|---|
| 2003/0097065 A1 | 5/2003 | Lee et al. |
| 2003/0122951 A1 | 7/2003 | Hara et al. |
| 2005/0012757 A1 | 1/2005 | Park et al. |
| 2006/0187477 A1* | 8/2006 | Maki ........................ G06T 11/60 358/1.9 |
| 2007/0147704 A1* | 6/2007 | Hirai ................ G03G 15/04018 382/294 |
| 2008/0273794 A1 | 11/2008 | Samworth |
| 2009/0157201 A1 | 6/2009 | Oguri et al. |
| 2009/0278857 A1* | 11/2009 | Wajs ......................... G06T 5/50 345/629 |
| 2009/0322926 A1* | 12/2009 | Ikeda ................... G06F 3/04845 348/333.01 |
| 2011/0317033 A1 | 12/2011 | King |
| 2012/0249584 A1* | 10/2012 | Naruse .................... G06T 11/60 345/629 |
| 2014/0092117 A1 | 4/2014 | Yoshimura et al. |
| 2014/0286619 A1 | 9/2014 | Nakagome et al. |
| 2015/0006183 A1 | 1/2015 | Daishaku |
| 2015/0049079 A1 | 2/2015 | Ding et al. |
| 2015/0055154 A1 | 2/2015 | Hasegawa |
| 2015/0348298 A1* | 12/2015 | Yamamoto ............ G06T 11/001 382/284 |

OTHER PUBLICATIONS

Xiao, Xuezhong, and Lizhuang Ma. "Color transfer in correlated color space."Proceedings of the 2006 ACM international conference on Virtual reality continuum and its applications. ACM, 2006.*
Erik Reinhard, et al., "Color Transfer between Images", IEEE Computer Graphics and Applications, Sep./Oct. 2001, pp. 34-40.
Daniel L. Ruderman, et al., "Statistics of cone responses to natural images: implications for visual coding", J. Opt. Soc. Am. A, Aug. 1998, pp. 2036-2045, vol. 15, No. 8.
Communication dated Nov. 24, 2015 from the Australian Patent Office in application No. 2014268148.

* cited by examiner

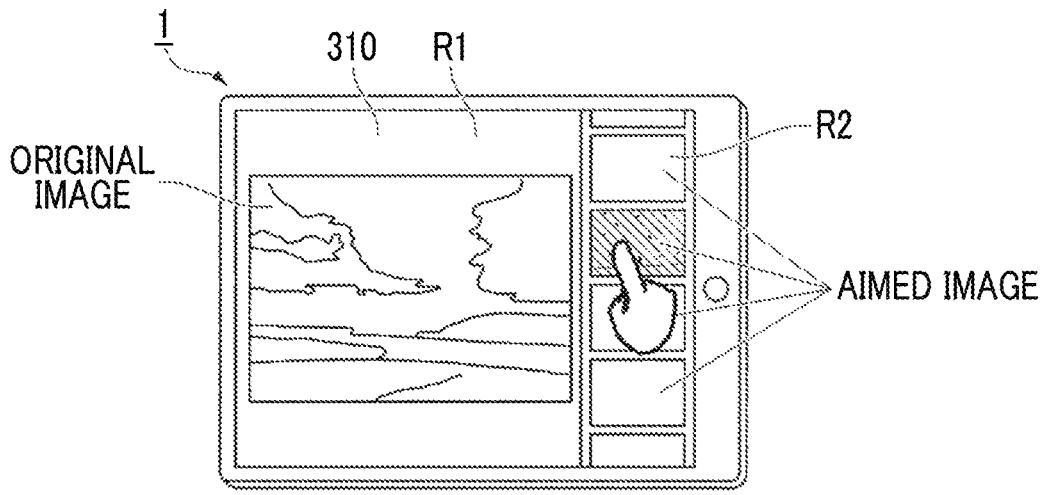
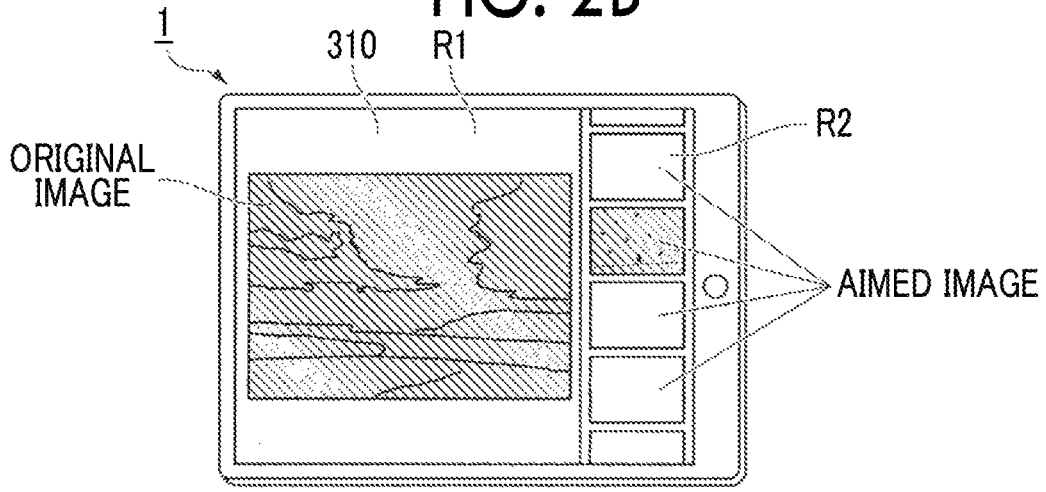
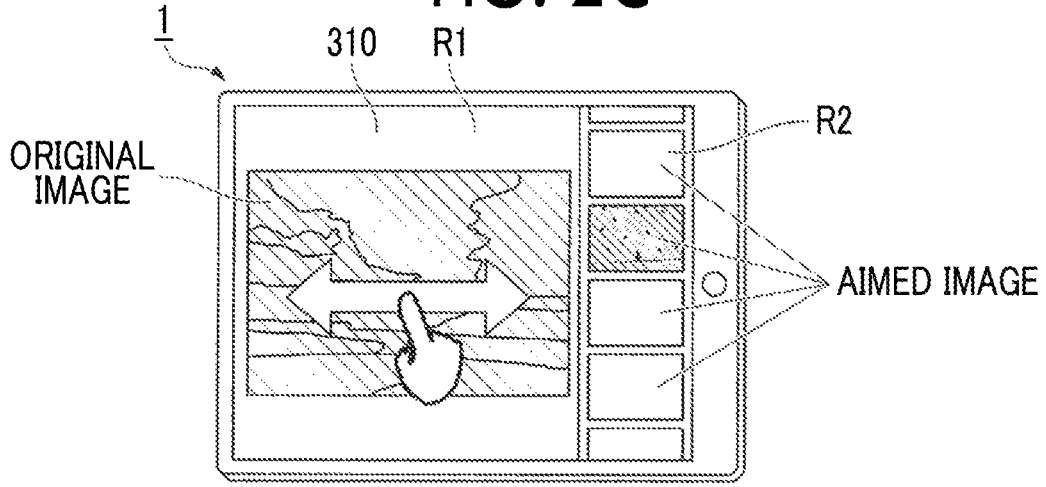

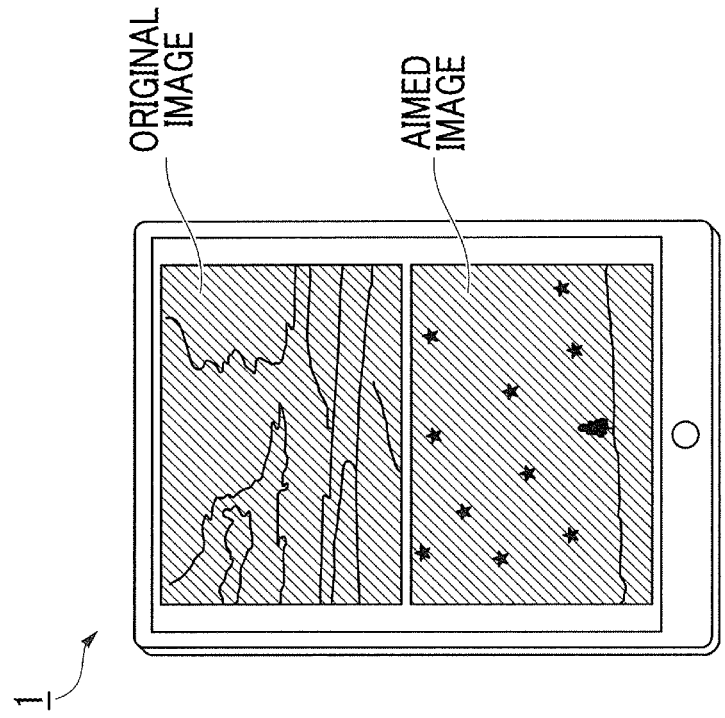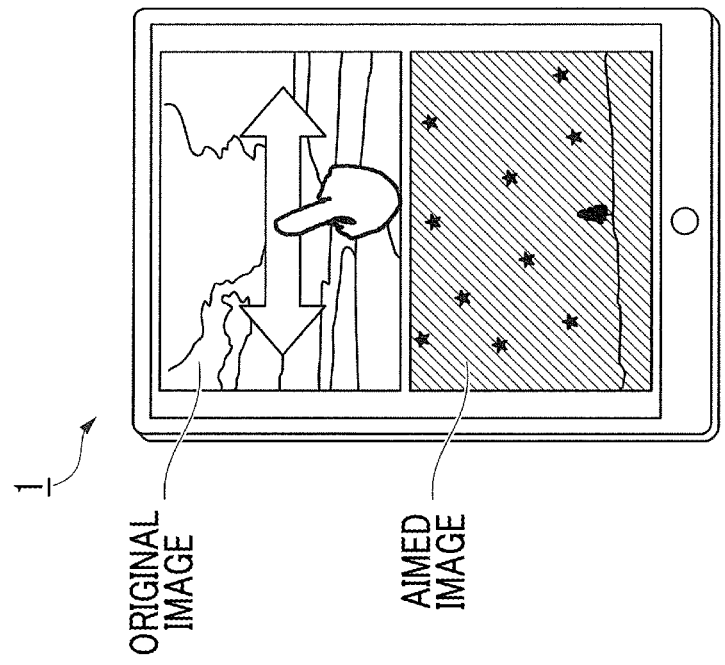

ORIGINAL IMAGE

AIMED IMAGE

☑ NIGHT MODE

AIMED IMAGE

☐ DAY MODE

ORIGINAL IMAGE
(FEATURE-REFLECTED IMAGE)

ORIGINAL IMAGE
(FEATURE-REFLECTED IMAGE)

IMAGE PROCESSING APPARATUS, AND NON-TRANSITORY COMPUTER READABLE MEDIUM FOR GENERATING A FEATURE-REFLECTED IMAGE AND FOR CHANGING A DEGREE OF REFLECTION OF A FEATURE IN THE FEATURE-REFLECTED IMAGE

CROSS-REFERENCE TO RELATED APPLICATIONS

This application is a Divisional of U.S. patent application Ser. No. 14/517,058, filed Oct. 17, 2014, which claims priority to Japanese Patent Application No. 2014-109567, filed May 27, 2014 the contents of all of which are incorporated herein by reference.

BACKGROUND

Technical Field

The present invention relates to an image processing apparatus, and a non-transitory computer readable medium.

SUMMARY

Here, in a case where a feature of another image is reflected on an object image which is an editing object, an impression of the object image may be made approximate to an impression of another image.

However, if the reflection of the feature on the object image is mechanically and uniformly performed, an image may be obtained which has an impression different from an impression which is desired by a user.

According to an aspect of the invention, there is provided an image processing apparatus including:

an acquisition section that acquires an object image which is an editing object;

a feature quantity acquisition section that acquires a feature quantity of a reference image which is referred to when the object image is edited;

a feature-reflected image generation section that reflects a feature of the reference image on the object image by using the feature quantity acquired by the feature quantity acquisition section, and generates a feature-reflected image which is the object image on which the feature is reflected; and a reflection degree changing section that changes a degree of reflection of the feature in the feature-reflected image by using an adjustment value which is input by a user.

BRIEF DESCRIPTION OF THE DRAWINGS

Exemplary embodiments of the present invention will be described in detail based on the following figures, wherein:

FIGS. 2A to 2C are diagrams illustrating an example of a process in the image processing apparatus;

FIGS. 9A and 9B are diagrams illustrating a display example on a display screen.

DETAILED DESCRIPTION

Hereinafter, with reference to the accompanying drawings, an exemplary embodiment of the invention will be described.

Figure 1:
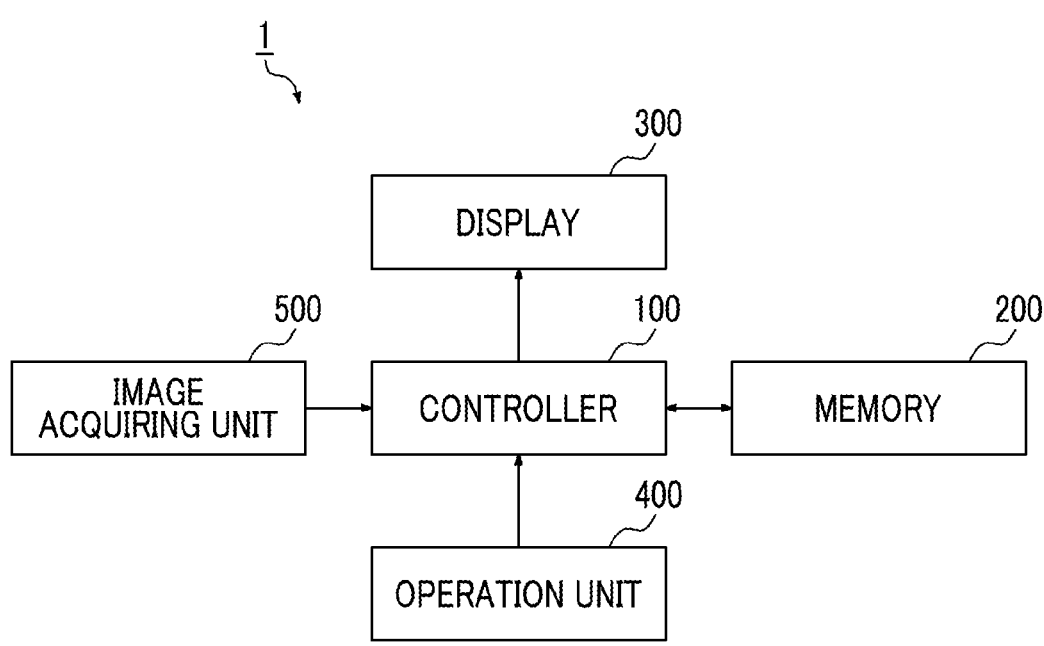
FIG. 1 is a block diagram exemplifying a hardware configuration of an image processing apparatus.

FIG. 1 is a block diagram exemplifying a hardware configuration of an image processing apparatus 1 according to an exemplary embodiment of the invention. The image processing apparatus 1 of the present exemplary embodiment includes a controller 100, a memory 200, a display 300, an operation unit 400, and an image acquiring unit 500.

The controller 100 includes a central processing unit (CPU), a read only memory (ROM), and a random access memory (RAM) (none of which are illustrated).

The ROM stores a control program executed by the CPU. The CPU reads the control program stored in the ROM, and executes the control program by using the RAM as a work area. The CPU executes the control program, and thus each functional unit such as a feature calculation unit 11 described later is realized.

The program executed by the CPU may be provided to the image processing apparatus 1 in a state of being stored on computer readable recording media such as a magnetic recording medium (a magnetic tape, a magnetic disk, or the like), an optical recording medium (an optical disc or the like), a magneto-optical recording medium, and a semiconductor memory. The program may be downloaded to the image processing apparatus 1 by using communication lines such as the Internet.

The memory 200 is constituted by, for example, a hard disk, and stores various data items such as image data.

The display 300 is constituted by, for example, a liquid crystal touch panel display, and displays, for example, an image based on image data under the control of the controller 100.

The operation unit 400 is a unit which is operated by a user, and acquires information which is input by the user. The operation unit 400 is constituted by, for example, a liquid crystal touch panel display. Here, in a case where the operation unit 400 and the display 300 are constituted by a liquid crystal touch panel display, the operation unit 400 and the display 300 are constituted by members common to each other. The operation unit 400 may be constituted by a mouse, a keyboard, or the like.

The image acquiring unit 500 which is an example of an acquisition section acquires an image (image data) provided from the user. Specifically, an original image or an aimed image described later is acquired. The image acquiring unit 500 is constituted by, for example, a connection interface connected to external apparatuses. In the present exemplary embodiment, if an image is acquired by the image acquiring unit 500, the image is output to the memory 200 and is stored in the memory 200.

FIGS. 2A to 2C are diagrams illustrating an example of a process in the image processing apparatus 1. FIGS. 2A to 2C exemplify a case where the image processing apparatus 1 is constituted by a so-called tablet terminal.

In the image processing apparatus 1 of FIGS. 2A to 2C, as illustrated in FIG. 2A, an original image display region R1 which displays an original image which is an unadjusted image is provided in a left region of a display screen 310 in the figure.

An aimed image display region R2 which displays plural aimed images which are aims of an original image is provided on the right side of the display screen 310. That is, plural aimed images which function as reference images which are referred to when the original image is adjusted (edited) are displayed on the right side of the display screen 310. More specifically, in the present exemplary embodiment, an original image which is an object image which is an editing object is displayed on the left side of the display screen 310, and aimed images which function as reference images referred to when the object image is edited are displayed on the right side of the display screen 310.

In the present exemplary embodiment, as in FIG. 2A, if the user touches the display screen 310 and selects one of the aimed images, a feature (scenery feature) of the selected aimed image is reflected (transferred to) on the original image as illustrated in FIG. 2B.

In the present exemplary embodiment, as illustrated in FIG. 2C, if the user slides and moves a finger (a finger touching the display screen 310) in a horizontal direction in the original image display region R1 (a swipe operation is performed), the original image displayed in the original image display region R1 varies.

Specifically, there is gradual variation from the original image having a high degree of reflection of the feature of the aimed image to the original image having a low degree of reflection of the feature of the aimed image. In addition, there is gradual variation from the original image having a low degree of reflection of the feature of the aimed image to the original image having a high degree of reflection of the feature of the aimed image.

More specifically, in the present exemplary embodiment, if the finger is moved toward the left direction of the arrow in FIG. 2C, the original image has a low degree of reflection of the feature of the aimed image, and finally has 0% of a degree of reflection. On the other hand, if the finger is moved toward the right direction of the arrow in FIG. 2C, the original image has a high degree of reflection of the feature of the aimed image, and finally has 100% of a degree of reflection.

Figure 3:
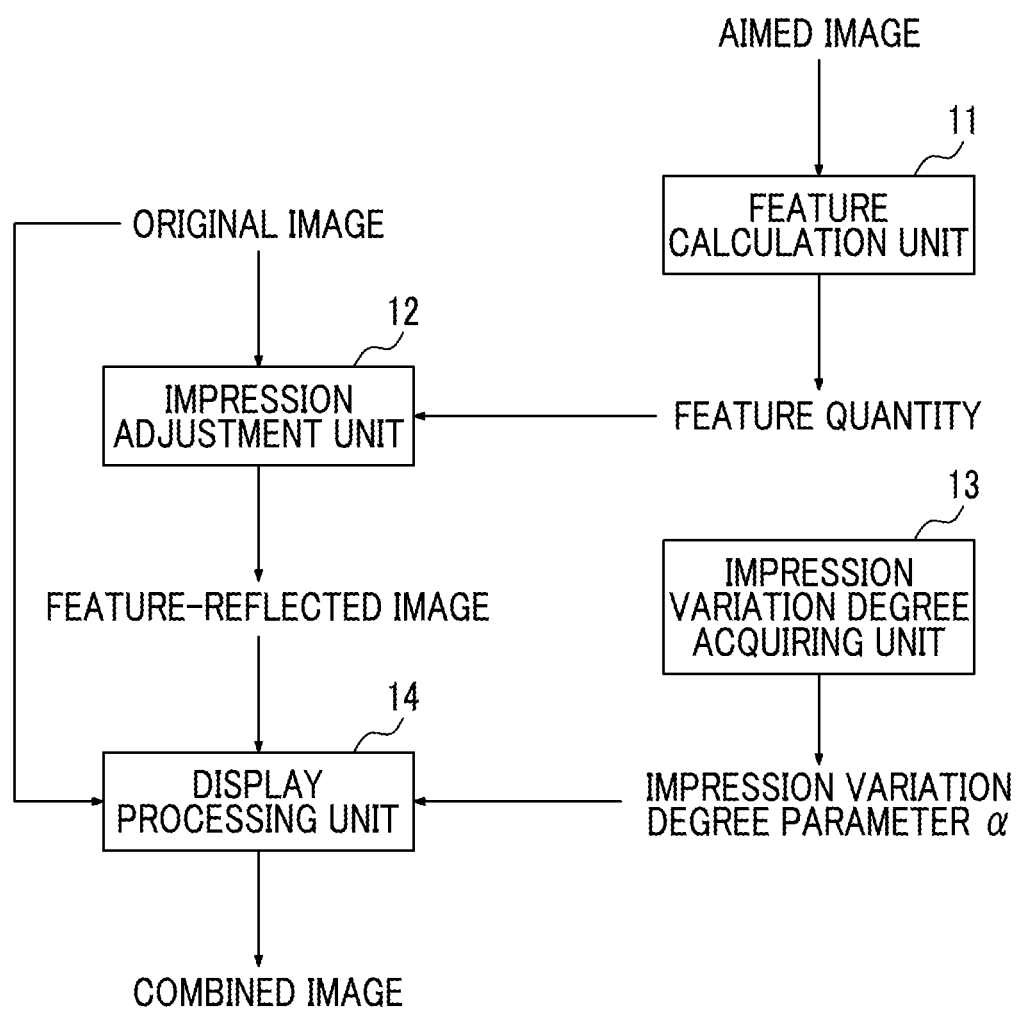
FIG. 3 is a diagram illustrating an example of a process performed in a controller when a feature of an aimed image is reflected on an original image.

FIG. 3 is a diagram illustrating an example of a process performed in the controller 100 when a feature of an aimed image is reflected on an original image.

In the present exemplary embodiment, first, an aimed image (image data thereof) is input to the feature calculation unit 11 which functions as a feature quantity acquisition section, from the memory 200 (refer to FIG. 1), and the feature calculation unit 11 analyzes the aimed image so as to calculate a feature quantity. Next, the feature quantity is input to an impression adjustment unit 12. In addition, an original image (image data thereof) is also input to the impression adjustment unit 12 from the memory 200.

Successively, the impression adjustment unit 12 which functions as a feature-reflected image generation section performs a process of reflecting a feature (a feature of the aimed image) specified by the feature quantity on the original image, so as to adjust (vary) an impression of the original image. Consequently, the original image on which the feature of the aimed image is reflected is generated.

More specifically, the impression adjustment unit 12 performs a process of fully reflecting the feature of the aimed image on the original image, so as to generate the original image having 100% of a degree of reflection of the feature of the aimed image. In the present specification, hereinafter, the original image on which the feature of the aimed image has been reflected is referred to as a "feature-reflected image" in some cases.

Then, in the present exemplary embodiment, the feature-reflected image is input to a display processing unit 14. The display processing unit 14 outputs the feature-reflected image to the display 300. Therefore, the feature-reflected image is displayed on the display 300.

After the feature-reflected image is displayed, when the user operates the display screen 310 (refer to FIG. 2C), an impression variation degree acquiring unit 13 acquires an impression variation degree parameter $\alpha$ which is input by the user. The impression variation degree parameter $\alpha$ is input to the display processing unit 14. That is to say, in the present exemplary embodiment, the impression variation degree acquiring unit 13 which functions as an adjustment value acquisition section acquires the impression variation degree parameter $\alpha$ which is an adjustment value input by the user, and outputs the impression variation degree parameter $\alpha$ to the display processing unit 14.

Here, the impression variation degree parameter $\alpha$ indicates a degree of reflection of a feature of an aimed image on an original image, and $\alpha$ ranges from 0 to 1 ($0 \le \alpha \le 1$).

Specifically, in the present exemplary embodiment, as described above, the user performs a sliding movement of the finger, and the impression variation degree parameter $\alpha$ is acquired based on the sliding movement (based on a movement amount of the finger of the user). More specifically, for example, in a case where the user's finger is slid and moved leftward in FIG. 2C, the impression variation degree parameter $\alpha$ with a small value is acquired, and in a case where the user's finger is slid and moved rightward in FIG. 2C, the impression variation degree parameter $\alpha$ with a great value is acquired.

When the impression variation degree acquiring unit 13 acquires the impression variation degree parameter $\alpha$, the display processing unit 14 (refer to FIG. 3) which functions as a reflection degree changing section performs a changing process on the feature-reflected image. More specifically, a degree of reflection of the feature quantity in the feature-reflected image is changed based on the impression variation degree parameter $\alpha$, and thus a new feature-reflected image is generated.

Even more specifically, in the present exemplary embodiment, if the impression variation degree parameter $\alpha$ is acquired, the display processing unit 14 combines the feature-reflected image (the image on which the feature is fully reflected) with the original image (the original image whose degree of reflection of the feature is 0%) so as to generate a new feature-reflected image, and, at this time, performs this combination by reflecting the impression variation degree parameter $\alpha$ acquired by the impression variation degree acquiring unit 13 thereon.

Then, the display processing unit 14 outputs the new image (hereinafter, referred to as a "combined image" in some cases) obtained through this combination process, to the display 300. Consequently, the new combined image is displayed on the display 300.

Here, if a feature of an aimed image is only mechanically and uniformly reflected on an original image, an image which is widely different from an image desired by a user may be obtained. In the process of the present exemplary embodiment, it is possible to obtain an image on which a user's desire is reflected and thus which is more approximate to the image desired by the user.

Here, each process performed in the feature calculation unit 11, the impression adjustment unit 12, and the display processing unit 14 will be described in detail.

Figure 4A:
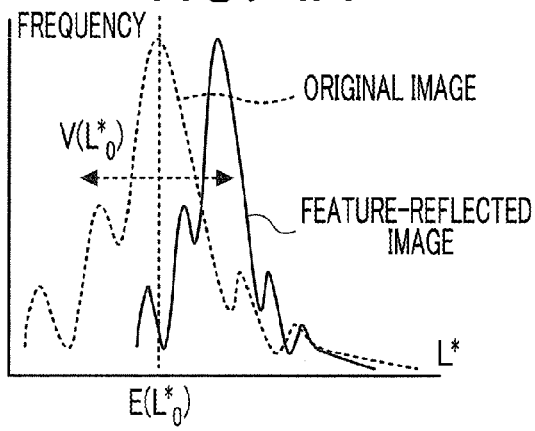
FIGS. 4A to 4F are diagrams illustrating processes performed in a feature calculation unit and an impression adjustment unit.
Figure 4B:
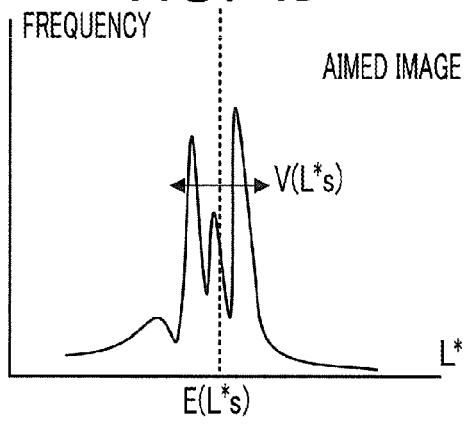
Figure 4C:
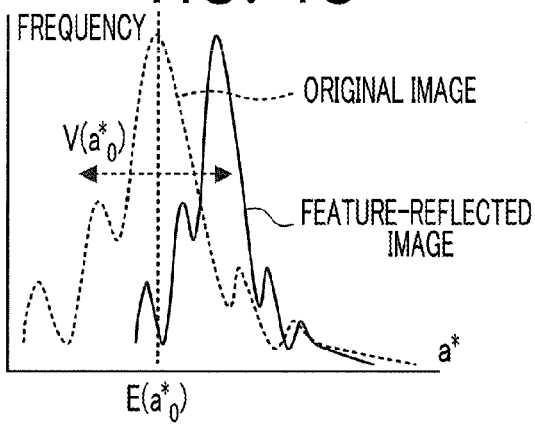
Figure 4D:
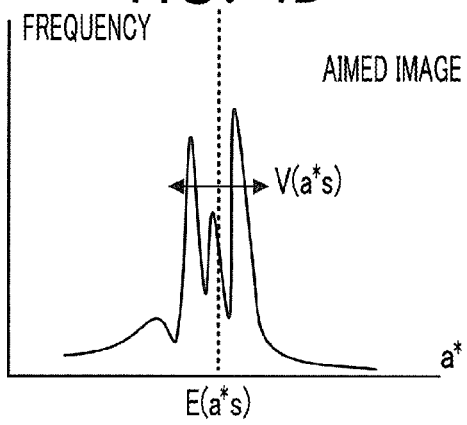
Figure 4E:
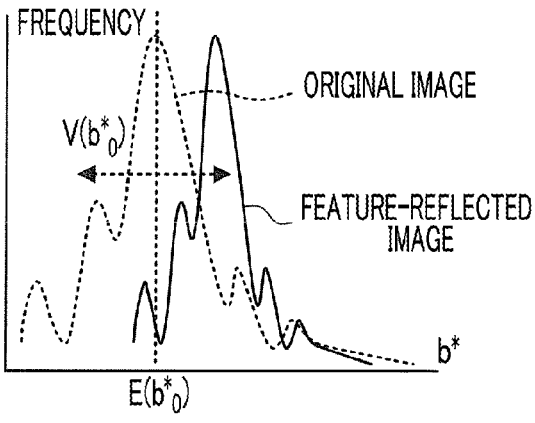
Figure 4F:
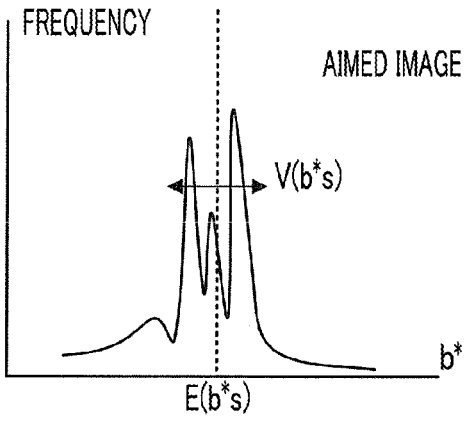

The feature calculation unit 11 calculates, as feature quantities, $E(L^*_s)$, $E(a^*_s)$, and $E(b^*_s)$ which are means of $L^*$, $a^*$, and $b^*$ of the entire aimed image as illustrated in FIGS. 4B, 4D and 4F (which are diagrams illustrating the processes performed in the feature calculation unit 11 and the impression adjustment unit 12). In addition, $V(L^*_s)$, $V(a^*_s)$, and $V(b^*_s)$ which are variances of $L^*$, $a^*$, and $b^*$ of the entire aimed image are also calculated as feature quantities.

The impression adjustment unit 12 (refer to FIG. 3) adjusts Lab values (CIE Lab values) of the original image for each pixel by using the means and the variances calculated by the feature calculation unit 11 and further by using the following Equations (1) to (3). That is to say, the adjustment process is performed so that means and variances of Lab values of the original image are approximate to the means and the variances of Lab values of the aimed image.

$$L^{*'}_{(i,j)} = [L^*_{(i,j)} - E(L^*_0)]\frac{V(L^*_s)}{V(L^*_0)} + E(L^*_s) \quad (1)$$

$$a^{*'}_{(i,j)} = [a^*_{(i,j)} - E(a^*_0)]\frac{V(a^*_s)}{V(a^*_0)} + E(a^*_s) \quad (2)$$

$$b^{*'}_{(i,j)} = [b^*_{(i,j)} - E(b^*_0)]\frac{V(b^*_s)}{V(b^*_0)} + E(b^*_s) \quad (3)$$

In Equations (1) to (3), $L^*_{(i,j)}$, $a^*_{(i,j)}$, and $b^*_{(i,j)}$ indicate unadjusted pixel values at a position (i,j), and $L^{*'}_{(i,j)}$, $a^{*'}_{(i,j)}$, and $b^{*'}_{(i,j)}$ indicate adjusted pixel values at the position (i,j).

In addition, $E(L^*_0)$, $E(a^*_0)$, and $E(b^*_0)$ are mean values of values of $L^*$, $a^*$, and $b^*$ of the original image as illustrated in FIGS. 4A, 4C and 4E, and $V(L^*_0)$, $V(a^*_0)$, and $V(b^*_0)$ are variances of values of $L^*$, $a^*$, and $b^*$ of the original image as illustrated in FIGS. 4A, 4C and 4E.

Here, in the present exemplary embodiment, a feature-reflected image is obtained by adjusting Lab values of the original image for each pixel by using Equations (1) to (3), and the feature-reflected image has a histogram shape approximate to a histogram shape of the aimed image as illustrated in FIGS. 4A, 4C and 4E. Consequently, an impression of the feature-reflected image is similar to an impression of the aimed image.

Next, a description will be made of the process in the display processing unit 14 (refer to FIG. 3). The display processing unit 14 combines the original image with the feature-reflected image by using the impression variation degree parameter α acquired by the impression variation degree acquiring unit 13 and the following Equations (4) to (6), so as to obtain a combined image.

$$L^{*''} = \alpha L^{*'} + (1-\alpha)L^* \quad (4)$$

$$a^{*''} = \alpha a^{*'} + (1-\alpha)a^* \quad (5)$$

$$b^{*''} = \alpha b^{*'} + (1-\alpha)b^* \quad (6)$$

Here, in each of Equations (4) to (6), $L^*$, $a^*$, and $b^*$ are pixel values of the original image, $L^{*'}$, $a^{*'}$, and $b^{*'}$ are pixel values of the feature-reflected image (the feature-reflected image on which the feature of the aimed image is fully reflected), and $L^{*''}$, $a^{*''}$, and $b^{*''}$ are pixel values of the combined image. As described above, α is an impression variation degree parameter.

In the above-described process, a case where the original image and the aimed image are images of the L*a*b* color space has been described as an example, but the same process as described may also be performed on images of color spaces such as RGB, 3-stimulus values LMS, a physiological value image IPT, and Lαβ.

Here, techniques of the related art regarding adjustment of an image will be described.

The adjustment of an image is to adjust component values or contrast of chromaticity, luminance, colors, and saturation on color spaces such as RGB, CIE Lab, and HSV, and various ideas such as control for each band or control for each region of an image have been proposed. Particularly, as methods of adjusting an impression in the appearance of an image, a method or the like of using a mean value of chromaticity has been proposed.

However, in such methods of the related art, particularly, in a case where colors of images are widely different from each other, it is difficult to match impressions between the images with each other. In relation to this problem, a method has been proposed in which impressions between images are matched with each other to some degree by matching statistical values of plural images in an Lαβ color space with each other.

In recent years, with the wide spread of apparatuses which are equipped with cameras and include touch panels, such as smart phones or tablet terminals, image processing and image editing including adjustment of image quality are more familiar to people other than professionals, and thus there is a demand for a method of adjusting an impression in the appearance of an image through simpler and more intuitive operations than in the related art. In light of these circumstances, it may be said that there is a necessity for a technique of not only matching impressions of images with each other but also of operating an image impression more interactively.

In such a technique of operating an image impression, a color space which tends to match an impression given to a human is required to be used, but there is a case where impressions may not match each other depending on an input image even if the color space which tends to match an impression given to a human is used.

For example, in a method of using an Lαβ color space, the Lαβ color space which is made in consideration of a human cone response or the like is used, but an impression of an image felt by a human is not defined only by a human cone response, and impressions may not match each other depending on an input image. This may be explained from the fact that, for example, a sky color memorized by a person, called a memory color, and an actual sky color are different from each other. Therefore, since images desired by a user may not necessarily be output in relation to all images, there is a problem in that it is difficult to use the method in actual image editing.

As mentioned above, various techniques for changing an impression of an image have been proposed, but, as may be seen from the fact that a memory color is present, there is a problem in that it is difficult to obtain an image desired by a user if only physical colors or luminances are matched with each other. In contrast, in the present exemplary embodiment, an image which is more approximate to an image desired by a user is provided to the user through an interactive operation by the user.

Figure 5:
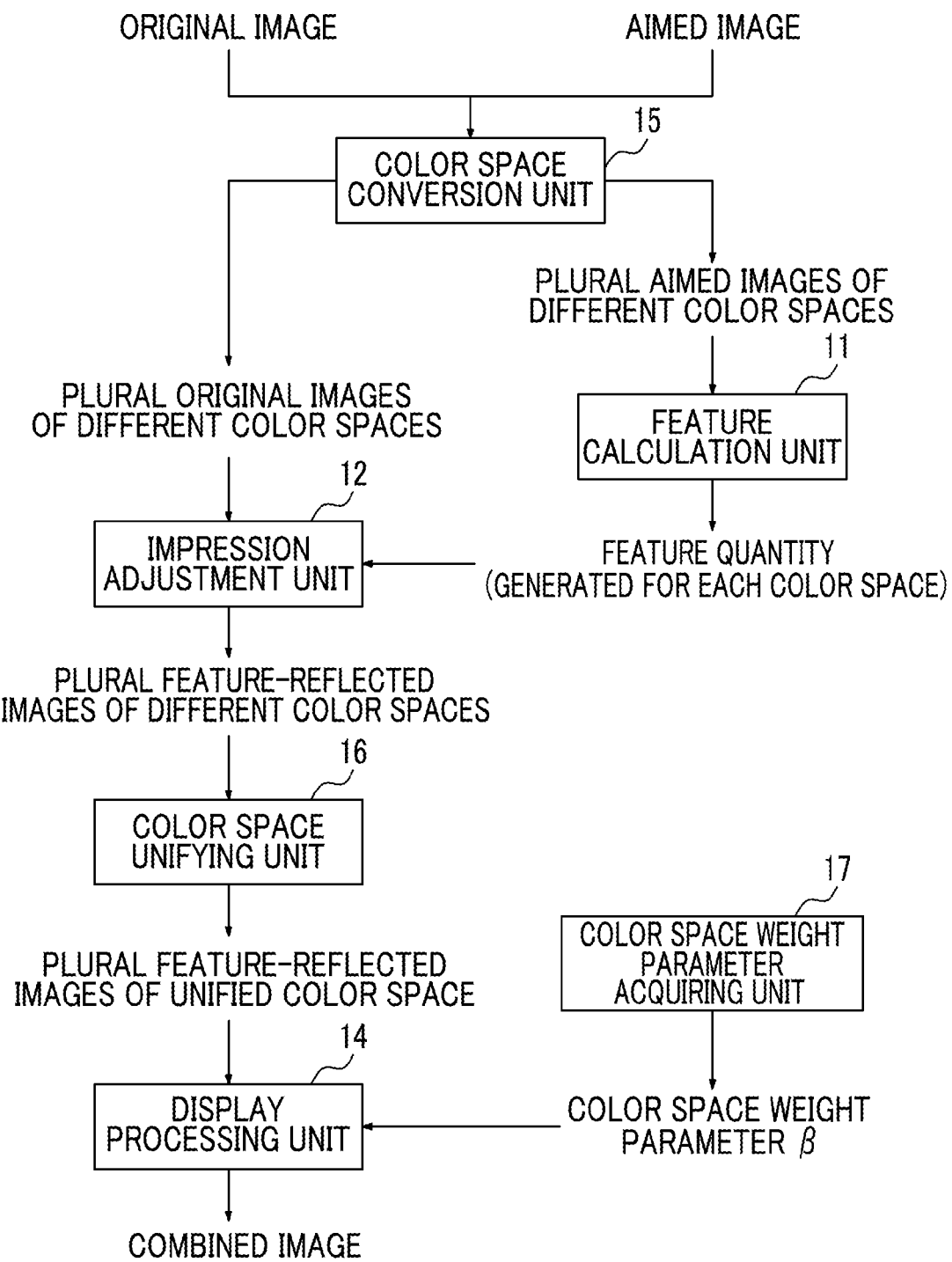
FIG. 5 is a diagram illustrating another process example performed in the controller.

FIG. 5 is a diagram illustrating another process example performed in the controller 100.

In this process, first, an original image and an aimed image stored in the memory 200 are input to a color space conversion unit 15. The color space conversion unit 15 which is an example of a reference image generation section performs color conversion on the aimed image (an example of a reference image) so as to generate plural aimed images of different color spaces.

Specifically, for example, an aimed image of an L*a*b* color space and an aimed image of an Lαβ color space are generated from an aimed image of an RGB color space.

Next, the feature calculation unit 11 calculates feature quantities in the above-described method for the respective plural aimed images of which the color spaces are different from each other. Specifically, a mean and a variance for each color space axis are calculated in relation to the plural aimed images.

For example, in a case where a color space of one of the plural aimed images is the L*a*b* color space, as described above, $E(L^*_s)$, $E(a^*_s)$, $E(b^*_s)$, $V(L^*_s)$, $V(a^*_s)$, and $V(b^*_s)$ are calculated for this aimed image.

Next, the feature quantities calculated for the respective plural aimed images are input to the impression adjustment unit 12.

In the present embodiment, the color space conversion unit 15 performs color conversion on the original image so as to generate plural original images of different color spaces.

Specifically, for example, an original image of an L*a*b* color space (CIE L*a*b* color space) and an original image of an Lαβ color space are generated from an original image of an RGB color space. That is to say, in the present exemplary embodiment, the color space conversion unit 15 which functions as a color conversion section generates plural original images of different color spaces, from a single original image.

In the present exemplary embodiment, the original images (the plural original images of different color spaces) having undergone the color conversion are output to the impression adjustment unit 12.

In the impression adjustment unit 12, as described above, the feature quantities calculated by the feature calculation unit 11 are reflected on the original images, and feature-reflected images are generated. That is to say, in the present exemplary embodiment, the impression adjustment unit 12 functions as a feature-reflected image generation section, and, in the impression adjustment unit 12, the feature quantities calculated by the feature calculation unit 11 are reflected on the respective plural original images of different color spaces, and thus plural feature-reflected images which are plural original images on which the feature quantities have been reflected are generated.

The feature-reflected images are generated for each color space, and the impression adjustment unit 12 generates feature-reflected images on which a feature of the aimed image is reflected and of different color spaces. That is to say, in the present exemplary embodiment, for each of different color spaces, a feature grasped by the feature calculation unit 11 is reflected on each of the plural original images, and thus plural feature-reflected images are generated.

More specifically, the impression adjustment unit 12 performs adjustment for each pixel value by the following Equation (7). Here, $I_{0(i,j)}$ is a pixel value at a position (i,j) for each axis of an unadjusted color space, and $I_0'_{(i,j)}$ is a pixel value at the position (i,j) for each axis of an adjusted color space.

$E(I_0)$ is a mean of image values for each axis of a color space of the original image, and $V(I_0)$ is a variance of the image values for each axis of the color space of the original image. $E(I_t)$ is a mean of image values for each axis of a color space of the aimed image, and $V(I_t)$ is a variance of the image values for each axis of the color space of the aimed image.

Equation (7) is the same as Equations (1) to (3) described above, for example, for an L*a*b* color space.

$$I'_{0(i,j)} = [I_{0(i,j)} - E(I_0)]\frac{V(I_t)}{V(I_0)} + E(I_t) \qquad (7)$$

Next, in the present exemplary embodiment, as illustrated in FIG. 5, the plural feature-reflected images of different color spaces are input to a color space unifying unit 16 which functions as a color space unifying section, so that the plural feature-reflected images of different color spaces are generated as feature-reflected images of the same color space.

For example, in a case where two feature-reflected images including a feature-reflected image of an L*a*b* color space and a feature-reflected image of an Lαβ color space are input to the color space unifying unit 16, the feature-reflected image of one color space is converted into the feature-reflected image of the other color space, and thus color spaces for the two feature-reflected images are the same as each other.

More specifically, for example, a feature-reflected image of an L*a*b* color space is converted into a feature-reflected image of an Lαβ color space, and thus the color spaces for the two feature-reflected images are unified into the Lαβ color space.

A unification destination of color spaces is not limited to either one of color spaces before being unified, and may be a color space which is not present before the unification. For example, in a case where two feature-reflected images including a feature-reflected image of an L*a*b* color space and a feature-reflected image of an Lαβ color space are present, the color spaces for the two feature-reflected images may be unified into an RGB color space.

The L*a*b* color space and the Lαβ color space have features in which characteristics thereof are relatively approximate to human visual characteristics, and thus if a unification destination of color spaces is set to the L*a*b* color space or the Lαβ color space, an effect increases in which a feature-reflected image is made approximate to an aimed impression. Therefore, an image desired by a user is easily obtained.

Next, in the present exemplary embodiment, plural feature-reflected images of the unified color space are output to the display processing unit 14. A color space weight parameter β which is acquired by a color space weight parameter acquiring unit 17 is output to the display processing unit 14.

In other words, in the present exemplary embodiment, the plural feature-reflected images of the unified color space are combined (α-combined) with each other so that a combined image is generated, and the color space weight parameter β indicating a combination ratio during the combination is acquired by the color space weight parameter acquiring unit 17 which functions as a ratio acquisition section, and the color space weight parameter β is output to the display processing unit 14 from the color space weight parameter acquiring unit 17.

Here, the display processing unit 14 which functions as a combined image generation section combines the plural feature-reflected images (the feature-reflected images after the color spaces are unified into one) with each other so as to form a single feature-reflected image. During the combination, the display processing unit 14 performs the combination by reflecting the color space weight parameter β acquired by the color space weight parameter acquiring unit 17. Specifically, the images are combined with each other by increasing a specific weight of an image of a color space having a great weight and reducing a specific weight of an image of a color space having a small weight.

The color space weight parameter acquiring unit 17 acquires the color space weight parameter β based on a sliding movement of a user's finger (based on a movement amount of the user's finger) in the same manner as in the above-described impression variation degree parameter α. More specifically, for example, in a case where the user moves the finger in the vertical direction in the figure as illustrated in FIG. 6 (which is a diagram illustrating an example of a user's operation on the image processing apparatus 1), the color space weight parameter β with a value corresponding to a movement amount of the finger is acquired.

Figure 6:
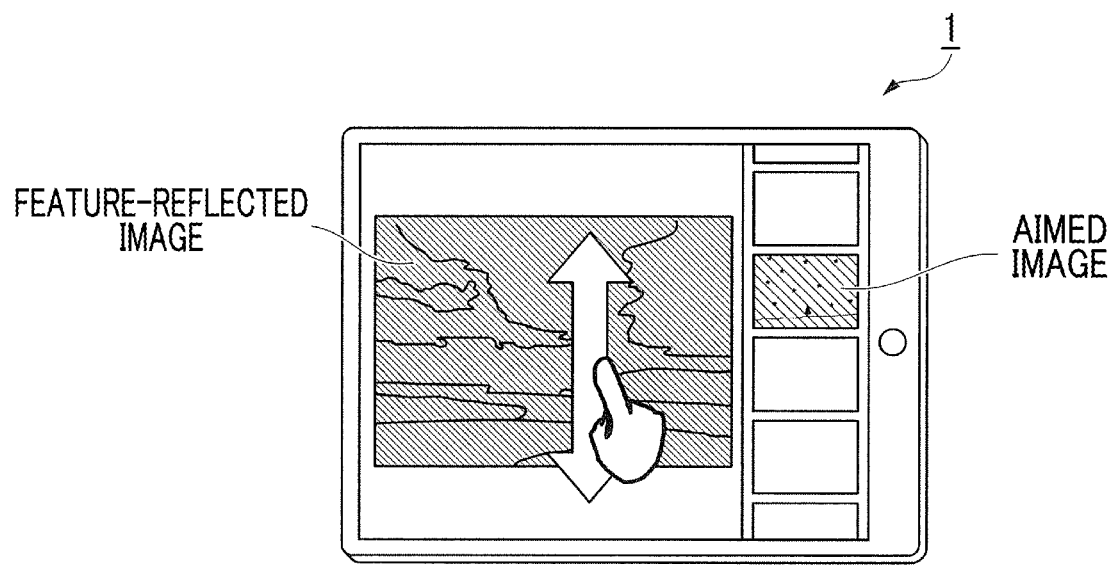
FIG. 6 is a diagram illustrating an example of a user's operation on the image processing apparatus.

Even more specifically, for example, in a case where the user slides and moves the finger upward in FIG. 6, the color space weight parameter β with a great value is acquired, and in a case where the user slides and moves the finger downward in FIG. 6, the color space weight parameter β with a small value is acquired.

In the present exemplary embodiment, the color space weight parameter β is grasped based on a user's operation on the touch panel, but the color space weight parameter β may be grasped based on a user's operation on a mouse or a keyboard. This is also the same for the impression variation degree parameter α which may be grasped based on a user's operation on a mouse or a keyboard.

The display processing unit 14 will be further described. The display processing unit 14 performs an adjustment process by using the plural feature-reflected images for which color spaces are unified into one by the color space unifying unit 16, the color space weight parameter β acquired by the color space weight parameter acquiring unit 17, and the following Equation (8), so as to obtain a combined image. In other words, in the present exemplary embodiment, the display processing unit 14 which functions as a combined image generation section combines the plural feature-reflected images for which color spaces are unified into one by the color space unifying unit 16, at a combination ratio designated by the user, so as to obtain a combined image.

$$I_{(i,j)}'' = \beta I_{c1(i,j)} + (1-\beta) I_{c2(i,j)} \qquad (8)$$

Here, $I_{c1(i,j)}$ indicates a pixel value of each pixel of a single feature-reflected image among the plural feature-reflected images output from the color space unifying unit 16, and $I_{c2(i,j)}$ indicates a pixel value of each pixel of another feature-reflected image among the plural feature-reflected images output from the color space unifying unit 16. In addition, β is a color space weight parameter as described above. Further, β is set to range from 0 to 1 ($0 \leq \beta \leq 1$).

Here, if feature-reflected images of a single color space are generated, an image on which a feature is scarcely reflected and with which the user has a sense of discomfort may be generated depending on the case.

On the other hand, in the configuration of the present exemplary embodiment, feature-reflected images of plural color spaces are combined with each other, and an extent of combination varies due to the color space weight parameter β. Therefore, there is a high possibility that a feature-reflected image with which the user hardly has a sense of discomfort may be obtained.

In the configuration of the present exemplary embodiment, since feature-reflected images of plural different color spaces are combined with each other, and the combination is performed at a ratio desired by the user by using the color space weight parameter β, distortion of a color space during adjustment of an impression of an image or a sense of discomfort occurring from human visual nonlinearity is reduced.

If a user's operation is performed on the touch panel again after the display processing unit 14 performs the display process, the color space weight parameter acquiring unit 17 acquires a new color space weight parameter β. In this case, the plural feature-reflected images are recombined with each other by using the new color space weight parameter β, so that a new combined image is generated. In other words, the new combined image is generated by using the new color space weight parameter β and the above Equation (8).

Figure 7:
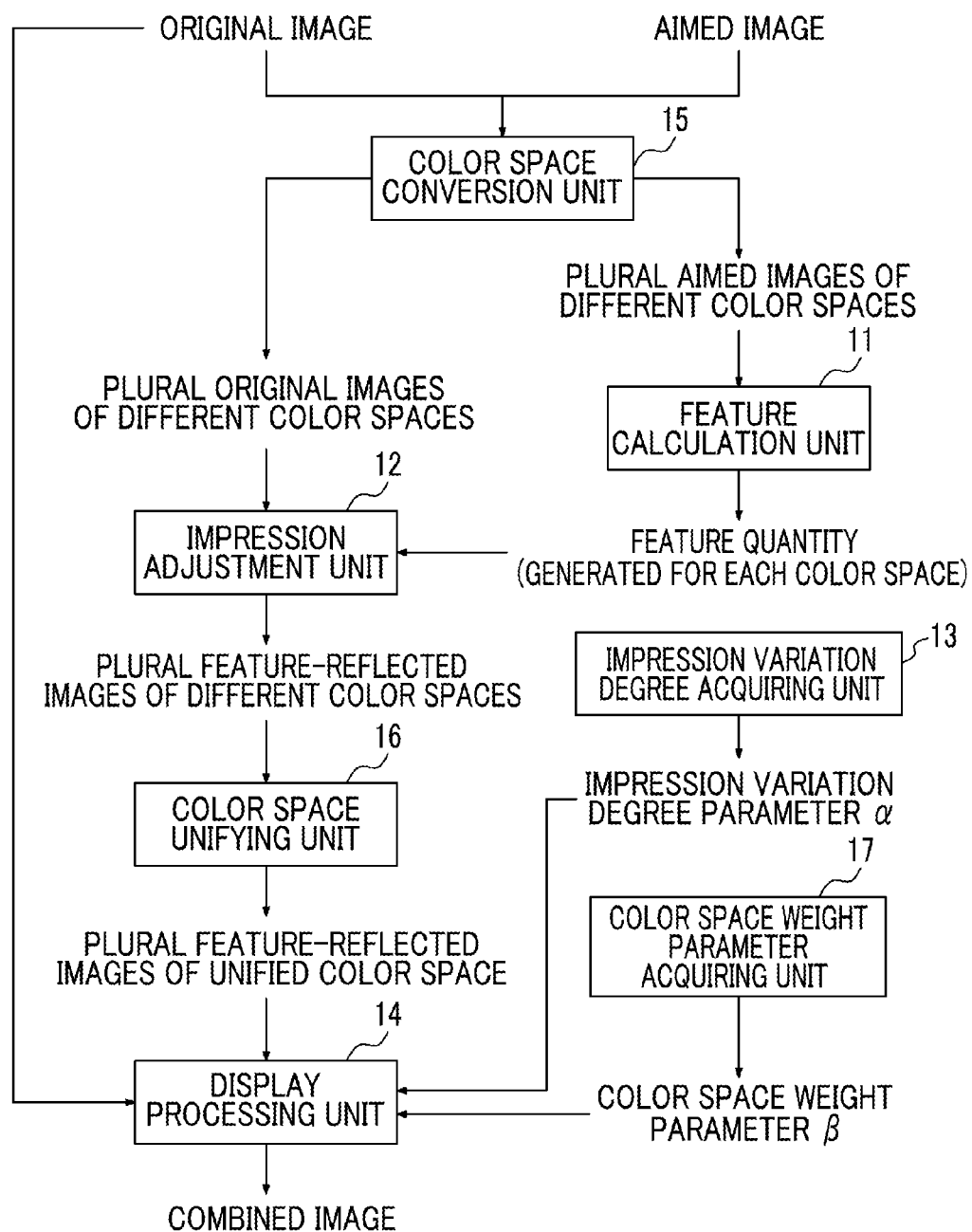
FIG. 7 is a diagram illustrating still another process example performed in the controller.

FIG. 7 is a diagram illustrating still another process example performed in the controller 100.

In this process, the same process as the process illustrated in FIG. 5 is performed up to the unification process of color spaces by the color space unifying unit 16. On the other hand, a process performed by the display processing unit 14 after the unification process of color spaces is performed by the color space unifying unit 16 is different from the process illustrated in FIG. 5.

In the process illustrated in FIG. 7, the plural feature-reflected images of the unified color space, the impression variation degree parameter α acquired by the impression variation degree acquiring unit 13, the color space weight parameter β acquired by the color space weight parameter acquiring unit 17, and the original image are input to the display processing unit 14.

The display processing unit 14 combines the plural feature-reflected images (the plural feature-reflected images after the color spaces are unified into one) with each other so as to form a single feature-reflected image.

During the combination, the display processing unit 14 performs the combination by reflecting the color space weight parameter β acquired by the color space weight parameter acquiring unit 17 which functions as a ratio acquisition section. That is to say, the display processing unit 14 acquires the color space weight parameter β which is an example of first ratio information which is used when the plural feature-reflected images are combined with each other, and performs the combination process on which the color space weight parameter β is reflected.

Specifically, the images are combined with each other by increasing a specific weight of an image of a color space having a great weight (ratio) and reducing a specific weight of an image of a color space having a small weight.

The display processing unit 14 combines the feature-reflected image (the feature-reflected image obtained by combining the plural feature-reflected images with each other by using the color space weight parameter β) with the original image, so as to generate a new feature-reflected image.

During the combination, the display processing unit 14 performs the combination by reflecting the impression variation degree parameter α acquired by the impression variation degree acquiring unit 13.

In other words, in the present exemplary embodiment, a component of the original image corresponding to a ratio specified by the impression variation degree parameter α is included in the new feature-reflected image which is generated by combining the feature-reflected image (the feature-reflected image obtained by combining the plural feature-reflected images with each other) with the original image. Specifically, in the present exemplary embodiment, the impression variation degree parameter α (an example of second ratio information) indicating a ratio of the original image in the newly generated feature-reflected image is acquired, and the feature-reflected image and the original image are combined with each other based on the impression variation degree parameter α.

More specifically, the display processing unit 14 combines the plural feature-reflected images of different color spaces with the original image by using the following Equation (9) so as to obtain a combined image.

$$I'_{s(i,j)} = \alpha * [\beta I_{c1(i,j)} + (1+\beta) I_{c2(i,j)}] + (1-\alpha) I_{s(i,j)} \quad (9)$$

Here, $I_{c1(i,j)}$ indicates a pixel value of each pixel of a single feature-reflected image among the plural feature-reflected images output from the color space unifying unit 16, and $I_{c2(i,j)}$ indicates a pixel value of each pixel of another feature-reflected image among the plural feature-reflected images output from the color space unifying unit 16. In addition, $I_{s(i,j)}$ indicates a pixel value of each pixel of the original image. Further, as described above, α is an impression variation degree parameter, and β is a color space weight parameter.

Figure 8:
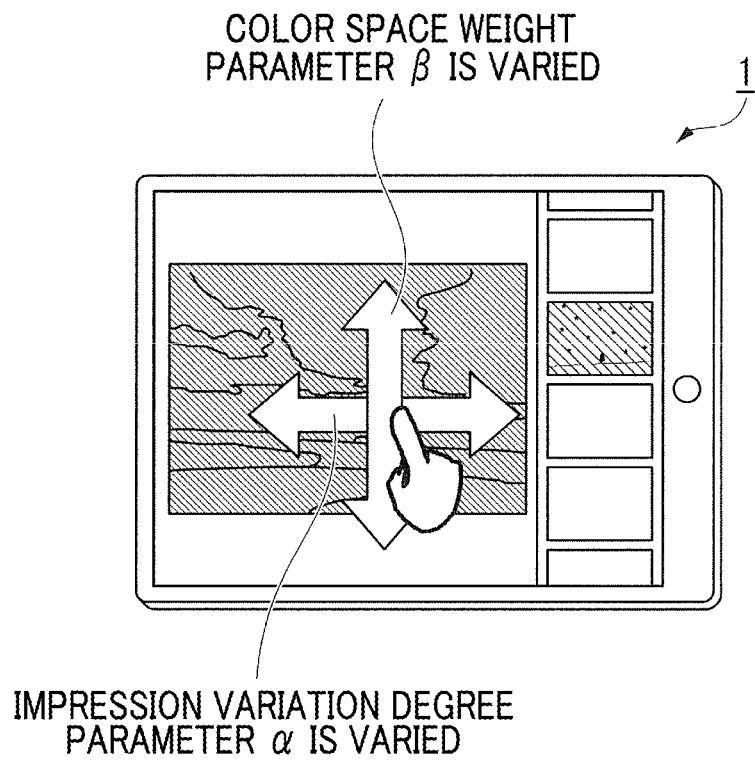
FIG. 8 is a diagram illustrating an example of a user's operation when the user inputs (changes) a value of each of an impression variation degree parameter and a color space weight parameter.

FIG. 8 is a diagram illustrating an example of a user's operation when the user inputs (changes) a value of each of the impression variation degree parameter α and the color space weight parameter β.

In this operation example, when the user inputs (changes) a value of the impression variation degree parameter α, the user moves the finger in the horizontal direction with respect to the display screen. When the user inputs (changes) a value of the color space weight parameter β, the user moves the finger in the vertical direction with respect to the display screen.

In other words, in this operation example, when a value of the impression variation degree parameter α is input (changed), the user moves the finger in one direction. When a value of the color space weight parameter β is input, the user moves the finger in a direction (a direction intersecting (perpendicular to) one direction) different from one direction.

When the user actually inputs (changes) the impression variation degree parameter α and the color space weight parameter β, the following operation is expected.

For example, first, the user moves the finger in the vertical direction so as to set the color space weight parameter β, thereby determining a combination ratio of plural different feature-reflected images.

Next, the user moves the finger in the horizontal direction so as to determine a combination ratio between the feature-reflected image which is obtained through the combination at the determined combination ratio and the original image.

In the process illustrated in FIGS. 7 and 8, in the same manner as in the process illustrated in FIG. 5, since feature-reflected images of plural different color spaces are combined with each other, and the combination is performed at a ratio desired by the user by using the color space weight parameter β, distortion of a color space during adjustment of an impression of an image or a sense of discomfort occurring from human visual nonlinearity is reduced. Since the feature-reflected image is combined with the original image, an image in which a sense of discomfort is further reduced is generated.

FIGS. 9A and 9B are diagrams illustrating a display example on the display screen.

In this display example, as illustrated in FIG. 9A, the display screen is divided into two screens. An original image is displayed on an upper part in FIG. 9A, and an aimed image is displayed on a lower part in FIG. 9A. Also in this example, as described above, if the user slides and moves the finger in the horizontal direction in the part where the original image is displayed, a degree of reflection of a feature quantity on the original image is varied (the impression variation degree parameter α is varied), and, for example, when a degree of reflection of a feature quantity is increased, the original image becomes similar to the aimed image as illustrated in FIG. 9B.

FIGS. 10A to 10E are diagrams illustrating another display example on the display screen.

Figure 10A:
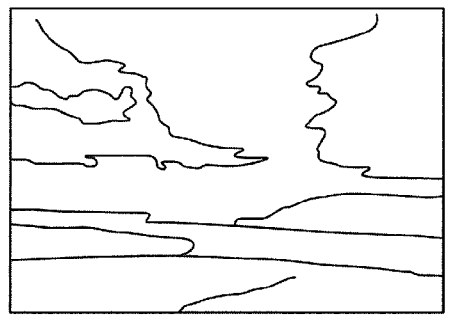
FIGS. 10A to 10E are diagrams illustrating another display example on the display screen.
Figure 10B:
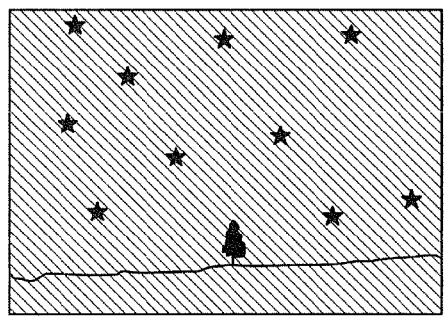
Figure 10C:
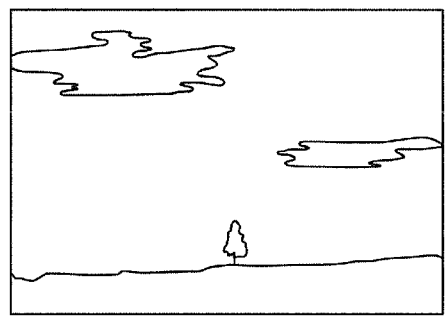

Here, FIG. 10A illustrates an original image. FIGS. 10B and 10C illustrate aimed images. In this display example, first, the user selects either one of the two aimed images illustrated in FIGS. 10B and 10C.

Figure 10D:
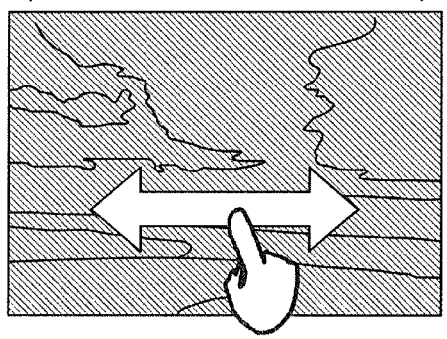
Figure 10E:
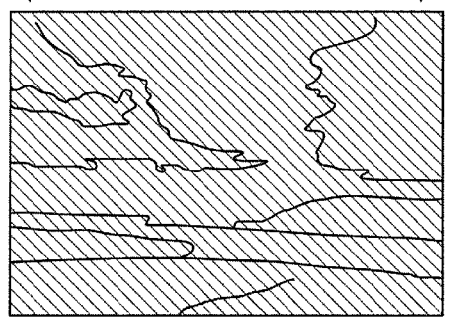

Then, as illustrated in FIG. 10D, the user slides and moves the finger on the original image. Consequently, as described above, a degree of reflection of a feature quantity on the original image is varied (the impression variation degree parameter α is varied), and thus the display screen illustrated in FIG. 10D is varied as illustrated in FIG. 10E.

Although a case where the impression variation degree parameter α is varied has been described in FIGS. 9A, 9B, and 10A to 10E, the finger is slid and moved in the vertical direction as described above in a case where the color space weight parameter β is varied.

Others

In the above description, a case where the image processing apparatus 1 is constituted by a so-called tablet terminal has been described as an example, but the image processing apparatus 1 may be constituted by a personal computer (PC) provided with a monitor, a keyboard, a mouse, and the like.

In the above description, a case where the impression variation degree parameter α and the color space weight parameter β are varied through a so-called swipe operation has been described, but there may be an aspect in which a display button which is slid and moved is displayed on a display screen, and the impression variation degree parameter α and the color space weight parameter β are varied by the user moving the display button. Numerical values of the impression variation degree parameter α and the color space weight parameter β may be directly input by using a numeric keypad (either of a hard keypad and a soft keypad may be used).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   at least one processor configured to execute:
   an acquisition section that acquires an object image which is an editing object;
   a feature quantity acquisition section that acquires a feature quantity of a reference image which is referred to when the object image is edited;
   a color conversion section that generates a plurality of the object images of different color spaces from the object image acquired by the acquisition section;
   a feature-reflected image generation section that reflects a feature of the reference image on each of the plurality of object images of different color spaces by using the feature quantity acquired by the feature quantity acquisition section, and generates a plurality of feature-reflected images which are the plurality of object images on which the feature is reflected; and
   a combined image generation section that combines the plurality of feature-reflected images generated by the feature-reflected image generation section with each other at a combination ratio designated by a user, so as to generate a combined image.

2. The image processing apparatus according to claim 1, wherein the at least one processor is further configured to execute:
   a ratio acquisition section that acquires the combination ratio designated by the user,
   wherein, when a new combination ratio is acquired by the ratio acquisition section, the combined image generation section combines the plurality of feature-reflected images with each other at the new combination ratio, so as to generate a new combined image.

3. The image processing apparatus according to claim 2, wherein the at least one processor is further configured to execute:
   a color space unifying section that unifies respective color spaces for the plurality of feature-reflected images generated by the feature-reflected image generation section into a predefined color space,
   wherein the combined image generation section generates the combined image by using the plurality of feature-reflected images after the color spaces are unified into one by the color space unifying section.

4. The image processing apparatus according to claim 3, wherein the at least one processor is further configured to execute:
   a reference image generation section that generates a plurality of reference images of different color spaces from the reference image which is referred to when the object image is edited,
   wherein the feature quantity acquisition section acquires the feature quantity for each of the plurality of reference images for which color spaces are converted into different color spaces, and
   wherein the feature-reflected image generation section reflects the feature on each of the plurality of object images for each of the different color spaces, so as to generate the plurality of feature-reflected images.

5. The image processing apparatus according to claim 2, wherein the at least one processor is further configured to execute:
   a reference image generation section that generates a plurality of reference images of different color spaces from the reference image which is referred to when the object image is edited,
   wherein the feature quantity acquisition section acquires the feature quantity for each of the plurality of reference images for which color spaces are converted into different color spaces, and
   wherein the feature-reflected image generation section reflects the feature on each of the plurality of object images for each of the different color spaces, so as to generate the plurality of feature-reflected images.

6. The image processing apparatus according to claim 1, wherein the at least one processor is further configured to execute:
   a color space unifying section that unifies respective color spaces for the plurality of feature-reflected images generated by the feature-reflected image generation section into a predefined color space,
   wherein the combined image generation section generates the combined image by using the plurality of feature-reflected images after the color spaces are unified into one by the color space unifying section.

7. The image processing apparatus according to claim 6, wherein the at least one processor is further configured to execute:
   a reference image generation section that generates a plurality of reference images of different color spaces from the reference image which is referred to when the object image is edited,
   wherein the feature quantity acquisition section acquires the feature quantity for each of the plurality of reference images for which color spaces are converted into different color spaces, and
   wherein the feature-reflected image generation section reflects the feature on each of the plurality of object images for each of the different color spaces, so as to generate the plurality of feature-reflected images.

8. The image processing apparatus according to claim 1, wherein the at least one processor is further configured to execute:
   a reference image generation section that generates a plurality of reference images of different color spaces from the reference image which is referred to when the object image is edited,
   wherein the feature quantity acquisition section acquires the feature quantity for each of the plurality of reference images for which color spaces are converted into different color spaces, and
   wherein the feature-reflected image generation section reflects the feature on each of the plurality of object images for each of the different color spaces, so as to generate the plurality of feature-reflected images.

9. The image processing apparatus according to claim 1, wherein the image processing apparatus comprises a tablet terminal or a personal computer.

10. An image processing apparatus comprising:
    at least one processor configured to execute:
    an acquisition section that acquires an object image which is an editing object;
    a color conversion section that generates a plurality of the object images of different color spaces from the object image acquired by the acquisition section;
    a feature quantity acquisition section that acquires a feature quantity of a reference image which is referred to when the object image is edited;

a feature-reflected image generation section that reflects a feature of the reference image on each of the plurality of object images of different color spaces by using the feature quantity acquired by the feature quantity acquisition section, and generates a plurality of feature-reflected images which are the plurality of object images on which the feature is reflected; and a combined image generation section that combines the plurality of feature-reflected images generated by the feature-reflected image generation section with the object image acquired by the acquisition section at a combination ratio designated by a user, so as to generate a combined image.

11. The image processing apparatus according to claim 10, wherein the at least one processor is further configured to execute:

a ratio acquisition section that acquires the combination ratio designated by the user, wherein the ratio acquisition section acquires first ratio information which is used for combination of the plurality of feature-reflected images generated by the feature-reflected image generation section, and second ratio information which indicates a ratio of the object image in the combined image.

12. The image processing apparatus according to claim 11, wherein the at least one processor is further configured to execute:

a touch panel that displays the combined image generated by the combined image generation section, wherein the ratio acquisition section acquires the first ratio information from a movement amount of a user's finger which is slid and moved on the touch panel in one direction, and acquires the second ratio information from a movement amount of the user's finger which is slid and moved on the touch panel in a direction different from the one direction.

13. The image processing apparatus according to claim 10, wherein the image processing apparatus comprises a tablet terminal or a personal computer.

14. A non-transitory computer readable medium storing a program that, when executed, causes a computer to execute:

an acquisition function of acquiring an object image which is an editing object;

a feature quantity acquisition function of acquiring a feature quantity of a reference image which is referred to when the object image is edited;

a color conversion function of generating a plurality of the object images of different color spaces from the object image acquired by the acquisition function;

a feature-reflected image generation function of reflecting a feature of the reference image on each of the plurality of object images of different color spaces by using the feature quantity acquired by the feature quantity acquisition function, and generating a plurality of feature-reflected images which are the plurality of object images on which the feature is reflected; and a combined image generation function of combining the plurality of feature-reflected images generated by the feature-reflected image generation function with each other at a combination ratio designated by a user, so as to generate a combined image.

15. A non-transitory computer readable medium storing a program that, when executed, causes a computer to execute:

an acquisition function of acquiring an object image which is an editing object;

a color conversion function of generating a plurality of the object images of different color spaces from the object image acquired by the acquisition function;

a feature quantity acquisition function of acquiring a feature quantity of a reference image which is referred to when the object image is edited;

a feature-reflected image generation function of reflecting a feature of the reference image on each of the plurality of object images of different color spaces by using the feature quantity acquired by the feature quantity acquisition function, and generating a plurality of feature-reflected images which are the plurality of object images on which the feature is reflected; and a combined image generation function of combining the plurality of feature-reflected images generated by the feature-reflected image generation function with the object image acquired by the acquisition function at a combination ratio designated by a user, so as to generate a combined image.

* * * * *